United States Patent
Acharya

(10) Patent No.: US 7,885,397 B2
(45) Date of Patent: Feb. 8, 2011

(54) ON-DEMAND SEAMLESS PHONE NUMBER UPDATES

(75) Inventor: Amit P. Acharya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 11/113,664

(22) Filed: Apr. 25, 2005

(65) Prior Publication Data

US 2006/0239434 A1   Oct. 26, 2006

(51) Int. Cl.
H04M 3/42   (2006.01)

(52) U.S. Cl. ............................. 379/218.01; 379/213.01

(58) Field of Classification Search ............ 379/142.04, 379/142.06, 142.07, 201.01, 201.08, 201.12, 379/207, 207.12, 207.13, 207.14; 455/418, 455/419
See application file for complete search history.

(56) References Cited

U.S. PATENT DOCUMENTS

| | | | |
|---|---|---|---|
| 5,146,403 A | | 9/1992 | Goodman |
| 5,361,297 A | * | 11/1994 | Ortiz et al. ................... 379/130 |
| 5,651,056 A | * | 7/1997 | Eting et al. ............... 379/88.01 |
| 5,732,132 A | * | 3/1998 | Hamada ...................... 379/354 |
| 5,832,061 A | * | 11/1998 | Rubin ........................ 379/88.1 |
| 5,835,570 A | * | 11/1998 | Wattenbarger ........... 379/88.03 |
| 6,173,045 B1 | | 1/2001 | Smith |
| 6,320,943 B1 | * | 11/2001 | Borland .................. 379/112.01 |
| 6,330,322 B1 | * | 12/2001 | Foladare et al. ......... 379/211.01 |
| 6,401,103 B1 | * | 6/2002 | Ho et al. ...................... 707/201 |
| 6,445,694 B1 | * | 9/2002 | Swartz ........................ 370/352 |
| 6,529,724 B1 | * | 3/2003 | Khazaka et al. ............. 455/405 |
| 6,553,116 B1 | * | 4/2003 | Vander Meiden ....... 379/355.08 |
| 6,671,508 B1 | | 12/2003 | Mitsuoka et al. |
| 6,675,204 B2 | | 1/2004 | De Boor et al. |
| 6,687,362 B1 | | 2/2004 | Lindquist et al. |
| 6,870,915 B2 | * | 3/2005 | Stillman et al. ......... 379/201.01 |
| 7,189,132 B2 | * | 3/2007 | Nacik et al. ......................... 1/1 |
| 7,289,614 B1 | * | 10/2007 | Twerdahl et al. ........ 379/142.01 |
| 2001/0040955 A1 | * | 11/2001 | Zolner et al. ........... 379/218.01 |
| 2002/0057774 A1 | | 5/2002 | Kim et al. |
| 2003/0091173 A1 | * | 5/2003 | DeSalvo ................. 379/142.01 |
| 2004/0229644 A1 | | 11/2004 | Heie et al. |
| 2005/0053220 A1 | * | 3/2005 | Helbling et al. ......... 379/211.02 |

FOREIGN PATENT DOCUMENTS

JP   2002141998   5/2002

* cited by examiner

Primary Examiner—Simon Sing
Assistant Examiner—Assad Mohammed
(74) Attorney, Agent, or Firm—Scott Paul, Esq.; Carey Rodriguez Greenberg & Paul, LLP

(57) ABSTRACT

A method, system and apparatus for on-demand phone number updating. A system for on-demand phone number updating can include a smooth number transition (SNT) call routing table mapping prior telephone numbers to new telephone numbers for corresponding SNT subscribers. The system further can include an SNT processor linked to the SNT routing table and communicatively coupled to switch logic in a PSTN. Finally, the system can include at least one SNT update table indicating whether different callers associated with a particular SNT subscriber have received an update for a new telephone number for the particular SNT subscriber. For instance, the SNT update table can be coupled to the server-side SNT processor, for instance as part of the SNT routing table, or the SNT update table can be disposed in a telephone system for the particular SNT subscriber.

14 Claims, 2 Drawing Sheets

ON-DEMAND SEAMLESS PHONE NUMBER UPDATES

BACKGROUND OF THE INVENTION

1. Statement of the Technical Field

The present invention relates to the field of telecommunications and more particular to changing telephone numbers in a telecommunications system.

2. Description of the Related Art

The intelligent network of today bears little semblance to the public switched telephone network (PSTN) of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), Toll Free Calling database and other databases containing customer information or additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs), databases containing service logic and subscriber information which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The advent of the advanced intelligent network has facilitated the development of several technologies of convenience for subscribers to telephone networks. One such technology supports local number portability. Local number portability refers to the ability of a telephone subscriber to maintain a telephone number even though the subscriber may change geographical locations away from the switch initially associated with the telephone number. To achieve local number portability, a table can be maintained in association with an SCP to correlate the telephone number of the subscriber with a new telephone number in a new location for the same subscriber. In this way, one who dials the telephone number of the subscriber can be automatically routed to the new telephone number without the knowledge of the caller.

Despite the conveniences of local number portability, most telephone subscribers prefer a telephone number associated with the geographical location of the subscriber. Having a "local" telephone number can be particularly important as a telephone subscriber establishes new relationships with potential callers in the new geographical location. Yet, telephone subscribers can be remiss to undertake the process of notifying established contacts of the new caller information. In this regard, to notify established contacts of new caller information can require the subscriber to send volumes of e-mails to established contacts as well the subscriber must initiate many phone calls to established contacts to apprise the established contacts of the new caller information. Likewise, for the established contacts, to update the new caller information for the telephone subscriber also can be an inconvenience.

SUMMARY OF THE INVENTION

The present invention addresses the deficiencies of the art in respect to updating the telephone number of a telephone subscriber and provides a novel and non-obvious method, system and apparatus for the on-demand, seamless updating of a telephone number for both mobile and non-mobile numbers. A method for on-demand phone number updating can include identifying a smooth number transition (SNT) subscriber based upon a telephone number provided to establish a telephone call between the SNT subscriber and another party. It can be determined whether the party already has received an updated telephone number for the SNT subscriber. If so, a directory entry for the SNT subscriber can be updated in a directory for the party.

The identifying step can include identifying an SNT subscriber based upon a called telephone number provided to establish a telephone call between the SNT subscriber and another party. Alternatively, the identifying step can include identifying an SNT subscriber based upon a calling telephone number provided to establish a telephone call between the SNT subscriber and another party. In either case, the determining step can include consulting either a server-side or a client-side table to determine whether the party already has received an updated telephone number for the SNT subscriber.

The updating step can include prompting the party to accept an update to the directory entry for the SNT subscriber. Responsive to the party accepting the update, the directory entry for the SNT subscriber can be updated in a directory for the party. Finally, the method further can include identifying a new telephone number mapped to the telephone number provided to establish the telephone call and routing the telephone call to the new telephone number.

A system for on-demand phone number updating can include an SNT call routing table mapping prior telephone numbers to new telephone numbers for corresponding SNT subscribers. The system further can include an SNT processor linked to the SNT routing table and communicatively coupled to switch logic in a PSTN. Finally, the system can include at least one SNT update table indicating whether different callers associated with a particular SNT subscriber have received an update for a new telephone number for the particular SNT subscriber. For instance, the SNT update table can be coupled to the server-side SNT processor, for instance as part of the SNT routing table, or the SNT update table can be disposed in a telephone system for the particular SNT subscriber.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for the seamless, on-demand updating of telephone numbers for both mobile and non-mobile telephones. In accordance with the present invention, a phone book entry for a telephone subscriber can be automatically updated with a new telephone number for the telephone subscriber when a call is completed between the party associated with the phone book and the telephone subscriber. The automatic updating can occur either when the telephone subscriber calls the party, or when the party calls the telephone subscriber.

Specifically, in a first scenario, when the party attempts a phone call to the telephone subscriber at a previously valid number, the call can be completed to a newly valid number for the telephone subscriber. Also, the party can be notified that the telephone subscriber has a new telephone number and the phone book of the party can be automatically updated with the newly valid number. Similarly, in a second scenario, when the telephone subscriber attempts a phone call to the party, the call can be completed and the party can be notified, for instance at the conclusion of the call, that the telephone subscriber has a new telephone number and the phone book of the party can be automatically updated with the newly valid number.

Figure 1:
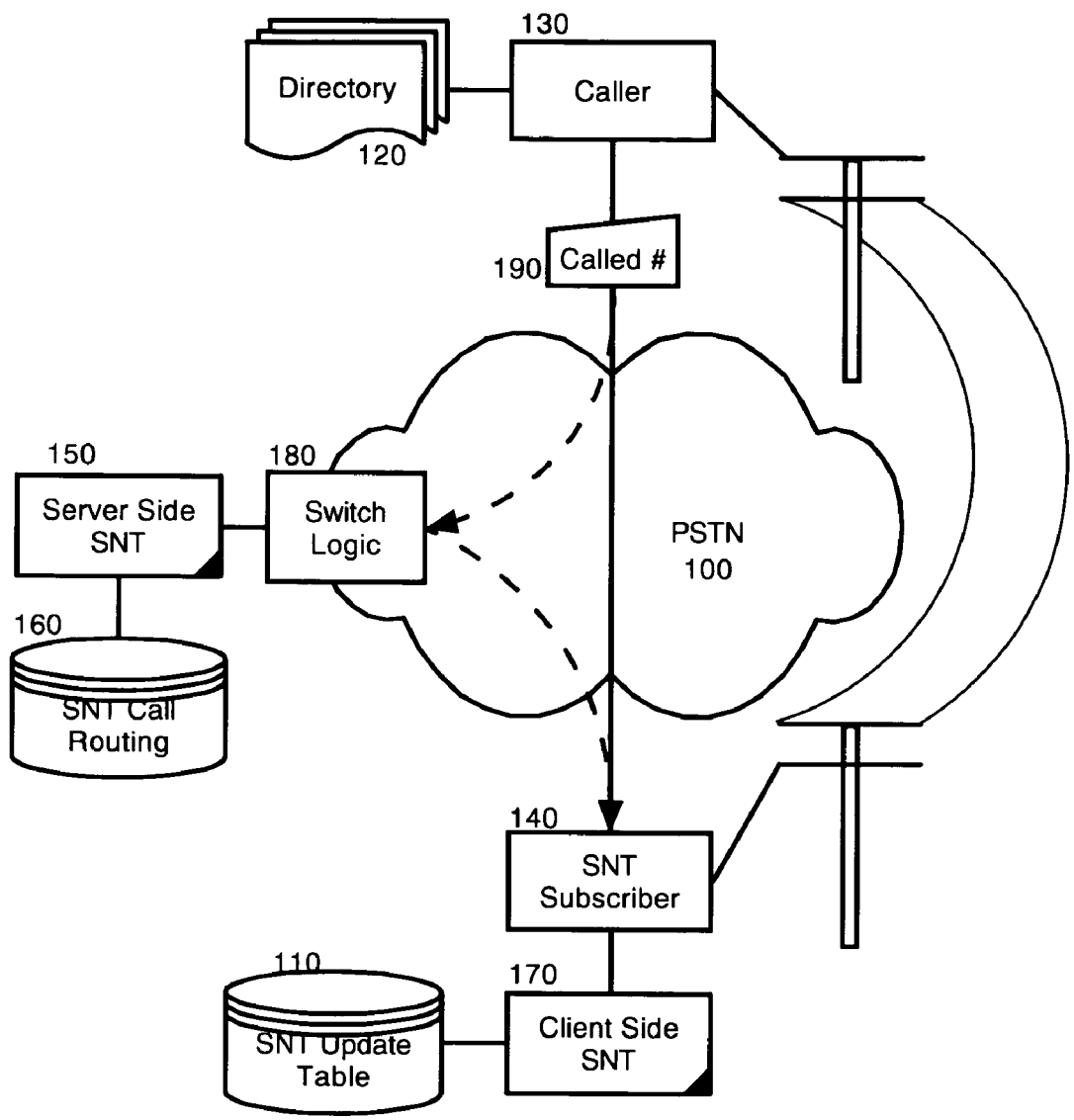
FIG. 1 is a schematic illustration of a system configured for on-demand, seamless telephone number updating for mobile and non-mobile telephones; and, FIG. 2 is a flow chart illustrating a process for on-demand, seamless telephone number updating for mobile and non-mobile telephones.

In more particular illustration, FIG. 1 is a schematic illustration of a system configured for on-demand, seamless telephone number updating for mobile and non-mobile telephones. The system can support call routing over a PSTN 100 as between a caller 130 and an SNT subscriber 140. To that end, the system can include switch logic 180 disposed with the PSTN 100. The switch logic 180 can be disposed in an SCP in an intelligent network, as an example. The switch logic 180 can be communicatively coupled to a server-side SNT processor 150 linked to an SNT call routing table 160. In this regard, the SNT processor 150 can be coupled to the switch logic over a data communications network, or the SNT processor 150 can be disposed in a switch with the switch logic 180.

The SNT call routing table 160 can include a mapping of prior and current telephone numbers for corresponding subscribers to the SNT service. Using the SNT call routing table 160, the switch logic 180 can route a call to a prior telephone number 190 for an SNT subscriber 140 to the current telephone number for the SNT subscriber 140. Additionally, regardless of whether the caller 130 or the SNT subscriber 140 has initiated the call, the SNT processor 150 can include programming to notify callers 130 that the prior telephone number associated with the SNT subscriber 140 has changed to the new telephone number. Finally, the SNT processor 150 can update the directory 120 for the caller 130 with the new telephone number for the SNT subscriber 140.

Notably, to ensure that the caller 130 is not repeatedly subjected to the on-demand, seamless updating of the present invention, an SNT update table 110 can be coupled to a client-side SNT updating processor 170 disposed within the telephone system of the SNT subscriber 140. The SNT update table 110 can record when the caller 130 has received an update to the new telephone number for the SNT subscriber 140. Responsive to the updating of a caller 130 with the new telephone number, when a subsequent call is established between the caller 130 and the SNT subscriber 140 the server side SNT processor 150 can avoid prompting the caller 130 to automatically update the directory 120 of the caller 130.

Notably, the present invention is not limited to on demand updating of a telephone number 190 in the course of the caller 130 initiating a telephone call over the PSTN 100 with the SNT subscriber 140. Rather, the present invention also can accommodate an on demand updating of a telephone number 190 in the course of a called party (not shown) receiving a telephone call from the SNT subscriber 140 over the PSTN 100. Also, while the SNT table 110 is shown in FIG. 1 be included with the SNT subscriber 140, the SNT table 110 can be disposed with the switch logic 180 and, in one aspect of the invention, can be incorporated as part of the SNT call routing table 160. Finally, the SNT update table 110 can be manually managed to force automatic updates for all callers.

Figure 2:
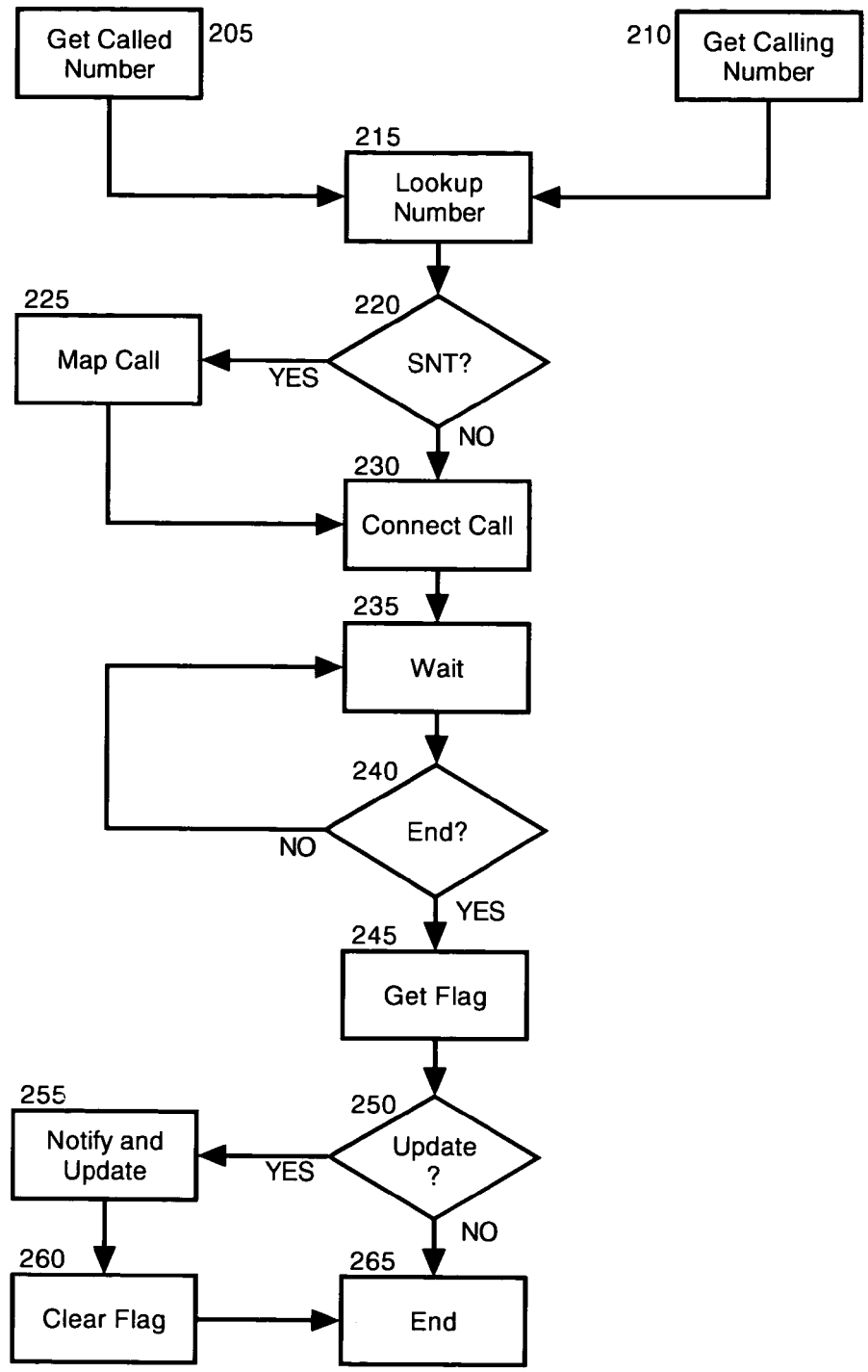

In further illustration of the operation of the present invention, FIG. 2 is a flow chart illustrating a process for on-demand, seamless telephone number updating for mobile and non-mobile telephones. Beginning in block 205, a called number for an SNT subscriber can be received for processing. Alternatively, a calling number for an SNT subscriber can be received for processing in block 210. In block 215, the number can be used to query a table to determine whether the number is associated with an SNT subscriber. If in decision block 220 the number is a prior number associated with an SNT subscriber, the prior number can be mapped to a new number in block 225 and the call can be connected in block 230.

In block 235, the call can remain connected until the call has been completed. In decision block 240, when the call has been completed, in block 245 the SNT flag can be inspected to determine whether the caller (or the called party as the case may be) has received an update to the prior number for the SNT subscriber. If in decision block 250 it is determined that caller (or the called party as the case may be) is be receive an automatic update due to the setting of the SNT flag, in block 255 the caller (or the called party as the case may be) can receive a notification that a new number for the SNT subscriber is available and the phone book for the caller (or the called party as the case may be) can receive an update for the SNT subscriber. Subsequently, the SNT flag can be cleared in block 260 indicating that the caller (or the called party as the case may be) has received the update and the process can end in block 265.

Thus, it will be recognized by the skilled artisan that unlike the conventional manner of updating caller information for established contacts of a telephone subscriber, in the present invention, the updating process is an on-demand process. Specifically, the on-demand process does not require that either the telephone subscriber or the established contacts initiate an update process. Accordingly, the problems inherent to conventional updating are no longer endemic in view of the present invention as the updating of caller information occurs suas ponte during a telephone call between an established contact and the telephone subscriber.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method performed by a hardware system for on-demand phone number updating, the method comprising the steps of:
   identifying, by the hardware system, a smooth number transition (SNT) subscriber based upon a telephone number provided to establish a telephone call between said SNT subscriber and another party;
   determining whether said another party already has received an updated telephone number for said SNT subscriber after the SNT subscriber has answered the telephone call; and
   responsive to determining that said another party has not already received the updated telephone number for said SNT subscriber, updating a directory entry for said SNT subscriber in a directory for said another party, wherein said determining is based upon information obtained by a consultation comprises of a server-side table or a client-side table to determine whether said another party already has received the updated telephone number for said SNT subscriber.

2. The method of claim 1, wherein said identifying comprises
   identifying an SNT subscriber based upon a called telephone number provided to establish a telephone call between said SNT subscriber and another party.

3. The method of claim 1, wherein said identifying comprises
   identifying an SNT subscriber based upon a calling telephone number provided to establish a telephone call between said SNT subscriber and another party.

4. The method of claim 1, wherein said updating comprises
   prompting said another party to accept an update to said directory entry for said SNT subscriber; and,
   responsive to said another party accepting said update, updating said directory entry for said SNT subscriber in a directory for said another party.

5. The method of claim 1, further comprising
   identifying a new telephone number mapped to said telephone number provided to establish said telephone call; and,
   routing said telephone call to said new telephone number.

6. A system for on-demand phone number updating, the system comprising:
   a server-side smooth number transition (SNT) call routing table mapping prior telephone numbers to new telephone numbers for corresponding SNT subscribers;
   an SNT processor linked to said SNT routing table and communicatively coupled to switch logic in a public switched telephone network (PSTN); and,
   at least one SNT update table indicating whether different callers associated with a particular SNT subscriber have received an update for a new telephone number for said particular SNT subscriber, wherein
   the SNT processor is configured to determine whether a different caller associated with the particular SNT subscriber already has received an updated telephone number for the particular SNT subscriber after the SNT subscriber has answered a telephone call from the different caller.

7. The system of claim 6, wherein said at least one SNT update table is coupled to said server-side SNT processor.

8. The system of claim 6, wherein said at least one SNT update table is disposed in a telephone system for said particular SNT subscriber.

9. The system of claim 6, wherein said at least one SNT update table is incorporated in said SNT call routing table.

10. A machine readable storage having stored thereon a computer program for on-demand phone number updating, the computer program comprising a routine set of instructions which when executed by a machine causes the machine to perform the steps of:
    identifying a smooth number transition (SNT) subscriber based upon a telephone number provided to establish a telephone call between said SNT subscriber and another party;
    determining whether said another party already has received an updated telephone number for said SNT subscriber after the SNT subscriber has answered the telephone call; and,
    responsive to determining that said another party has not already received the updated telephone number for said SNT subscriber, updating a directory entry for said SNT subscriber in a directory for said another party, wherein said determining is based upon information obtained by a consultation comprises of a server-side table or a client-side table to determine whether said another party already has received the updated telephone number for said SNT subscriber.

11. The machine readable storage of claim 10, wherein said identifying comprises
    identifying an SNT subscriber based upon a called telephone number provided to establish a telephone call between said SNT subscriber and another party.

12. The machine readable storage of claim 10, wherein said identifying comprises
    identifying an SNT subscriber based upon a calling telephone number provided to establish a telephone call between said SNT subscriber and another party.

13. The machine readable storage of claim 10, wherein said updating comprises
    prompting said another party to accept an update to said directory entry for said SNT subscriber; and,
    responsive to said another party accepting said update, updating said directory entry for said SNT subscriber in a directory for said another party.

14. The machine readable storage of claim 10, further comprising
    identifying a new telephone number mapped to said telephone number provided to establish said telephone call; and,
    routing said telephone call to said new telephone number.

* * * * *